(12) United States Patent
Christandl et al.

(10) Patent No.: US 10,365,423 B2
(45) Date of Patent: Jul. 30, 2019

(54) LIGHT GUIDE BODY COMPRISING AN INJECTION-MOULDED MAT AND LIGHT CHANNELS

(71) Applicants: Dieter Christandl, Weiz (AT); Josef Christandl, St. Ruprecht/Raab (AT); Robert Hofer, St. Ruprecht/Raab (AT)

(72) Inventors: Dieter Christandl, Weiz (AT); Josef Christandl, St. Ruprecht/Raab (AT); Robert Hofer, St. Ruprecht/Raab (AT)

(*) Notice: Subject to any disclaimer, the term of this patent is extended or adjusted under 35 U.S.C. 154(b) by 0 days.

(21) Appl. No.: 15/560,671

(22) PCT Filed: Dec. 10, 2015

(86) PCT No.: PCT/EP2015/002491
§ 371 (c)(1),
(2) Date: Sep. 22, 2017

(87) PCT Pub. No.: WO2016/150454
PCT Pub. Date: Sep. 29, 2016

(65) Prior Publication Data
US 2018/0106945 A1    Apr. 19, 2018

(30) Foreign Application Priority Data

Mar. 25, 2015    (DE) .................. 20 2015 002 273

(51) Int. Cl.
*F21V 8/00*    (2006.01)
*F21S 8/06*    (2006.01)
(Continued)

(52) U.S. Cl.
CPC .......... *G02B 6/0021* (2013.01); *E04B 9/0421* (2013.01); *F21S 8/06* (2013.01);
(Continued)

(58) Field of Classification Search
CPC .......... F21S 8/02; F21S 8/03; F21W 2111/027
(Continued)

(56) References Cited

U.S. PATENT DOCUMENTS

2010/0259470 A1*  10/2010  Kohtoku ............. G02B 6/0021
                                                    345/102
2011/0175533 A1*   7/2011  Holman ................... E04B 9/32
                                                    315/130

(Continued)

*Primary Examiner* — Edwyn Labaze
(74) *Attorney, Agent, or Firm* — Browdy and Neimark, P.L.L.C.

(57) ABSTRACT

Disclosed is a light guide mat (1) for the production of a block- or cuboid-shaped light guide body (21), which mat is arranged in a casting mold and can be sealed in a pourable, curable casting compound (24), wherein the light guide mat (1) consists of longitudinal and transverse struts (2, 3) connected to one another in the form of a grid, which struts consist at least partially of a light-conducting plastic, wherein profiled light guide elements (4) consisting of an at least partially light-conducting plastic are integrally formed at the point of intersection of the longitudinal and transverse struts (2, 3), an end face (6) of which elements being formed as light-emitting surfaces on the upper face (22) of the light guide body (21), wherein at least the longitudinal struts (2) of the light guide mat (1) are formed as light channels (5) for receiving point-like, light-generating elements, and the light channels (5) are integrally formed on the face of the light guide elements (4) near to the bottom.

15 Claims, 16 Drawing Sheets

(51) Int. Cl.
  *E04B 9/04*      (2006.01)
  *F21W 111/023*   (2006.01)
  *F21Y 105/10*    (2016.01)
  *F21Y 115/10*    (2016.01)
  *F21Y 105/16*    (2016.01)

(52) U.S. Cl.
  CPC ..... *F21W 2111/023* (2013.01); *F21Y 2105/10* (2016.08); *F21Y 2105/16* (2016.08); *F21Y 2115/10* (2016.08)

(58) Field of Classification Search
  USPC ................................ 362/153, 152, 145, 146
  See application file for complete search history.

(56) References Cited

U.S. PATENT DOCUMENTS

| | | | |
|---|---|---|---|
| 2011/0211332 A1* | 9/2011 | Hilscher | .............. F21V 7/22 362/84 |
| 2013/0201720 A1* | 8/2013 | Sherman | .............. G02B 6/0068 362/607 |
| 2014/0122143 A1* | 5/2014 | Fletcher | ............. G06Q 10/0631 705/7.14 |

* cited by examiner

SCHNITT A-A

SCHNITT A-A = CROSS-SECTION A-A

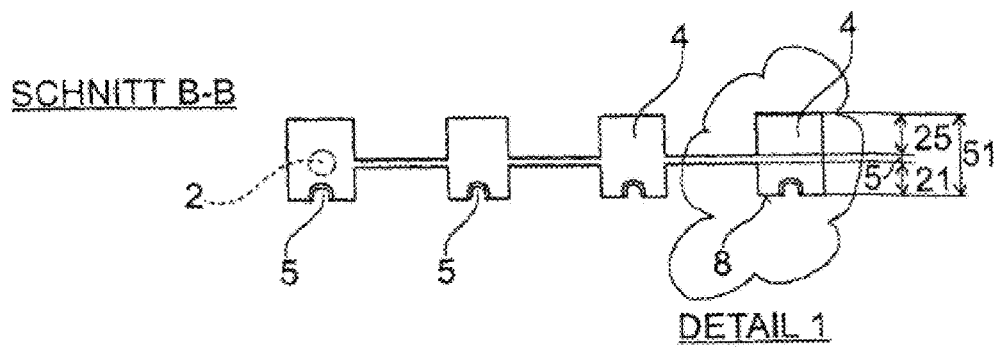
Fig. 3
SCHNITT B-B = CROSS-SECTION B-B
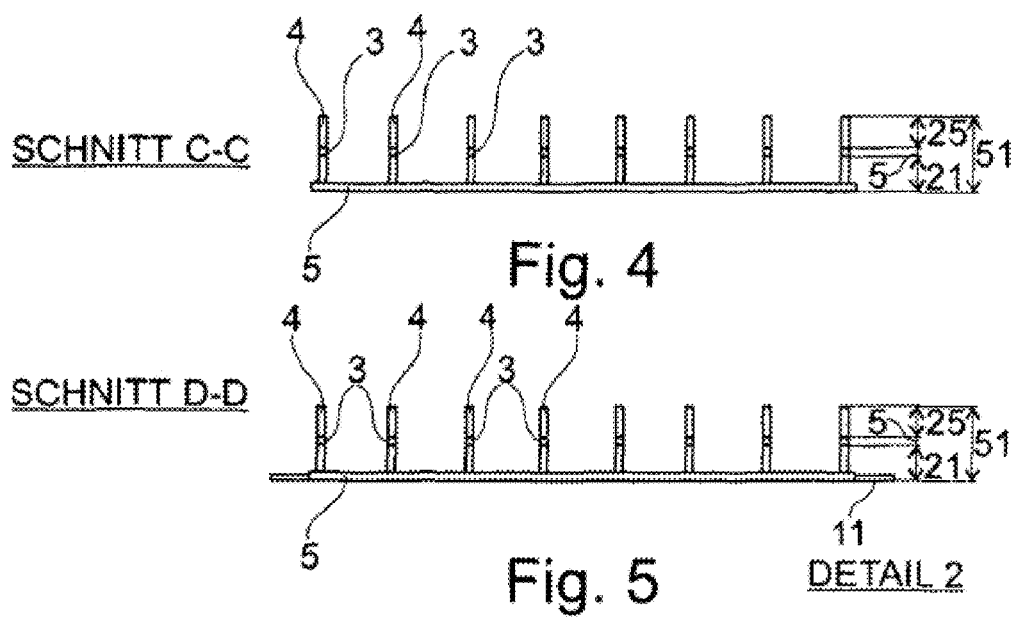
Fig. 4
Fig. 5
SCHNITT C-C = CROSS-SECTION C-C
SCHNITT D-D = CROSS-SECTION D-D

DETAIL 1

DETAIL 2

DETAIL 1 MIT LICHT QUELLE

DETAIL 1 MIT LICHTQUELLE = DETAIL 1 WITH LIGHT SOURCE

U-PROFIL für 12

U-PROFIL für 12 = U-PROFILE for 12

SCHNITT A-A = CROSS-SECTION A-A
SCHNITT B-B = CROSS-SECTION B-B

SCHNITT C-C

SCHNITT D-D

SCHNITT C-C = CROSS-SECTION C-C
SCHNITT D-D = CROSS-SECTION D-D

U-PROFIL von 12 = U-PROFILE from 12

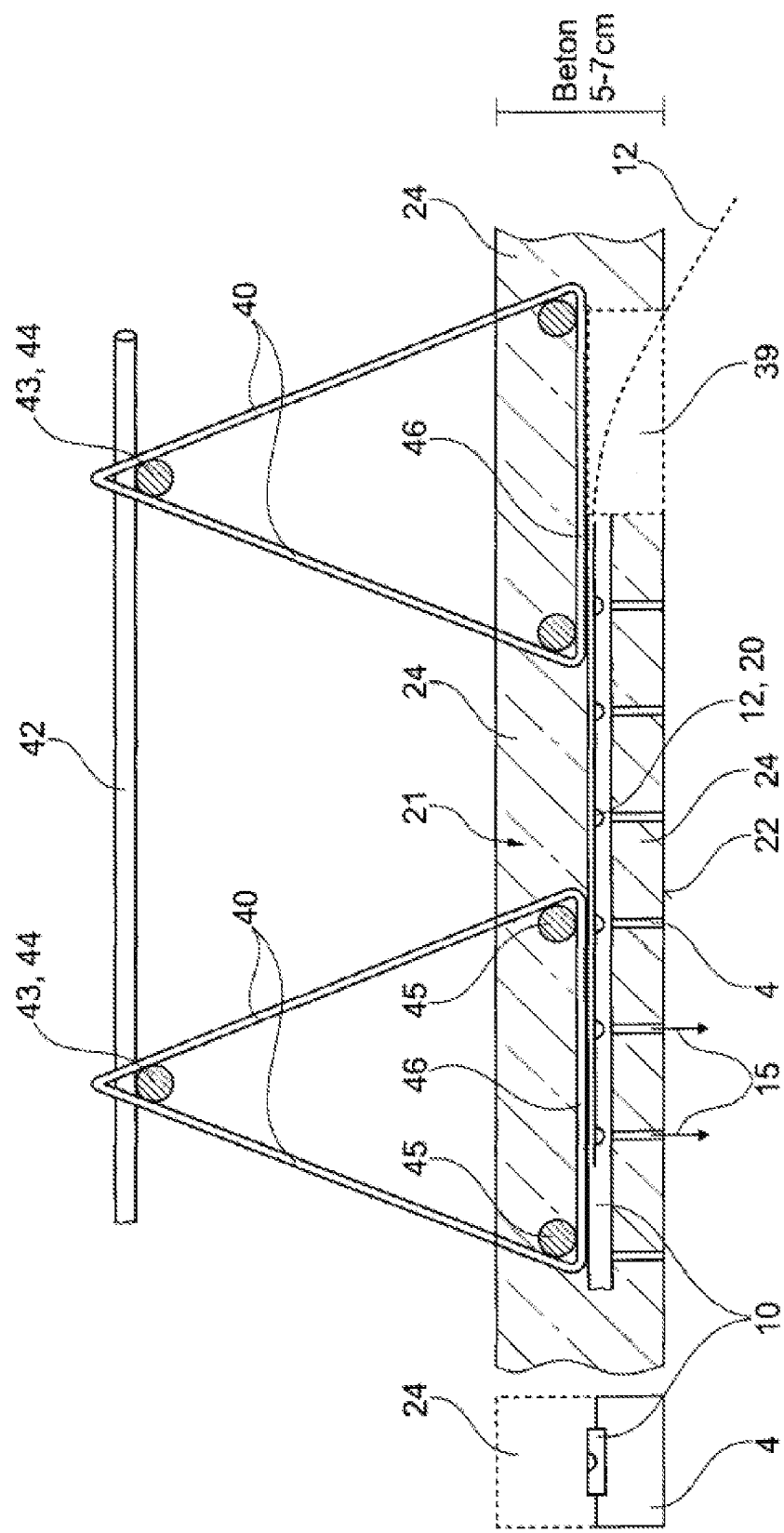
Beton 5-7 cm = Concrete 5-7 cm

LIGHT GUIDE BODY COMPRISING AN INJECTION-MOULDED MAT AND LIGHT CHANNELS

FIELD

The subject matter of the invention is a light guide body that consists of a cured casting compound, in which an injection-molded mat is embedded. The invention further relates to an injection-molded mat, which in the following shall also be called light guide mat and is suitable for embedding in a curable casting compound in order to form a highly stressable light guide body.

BACKGROUND

A light guide body consisting of a curable casting compound, for example, has become known from the subject matter of WO 2012/097975 A1 by the same applicant. An injection-molded mat suitable for embedding in the light guide body has also become known from said document. Reference is herewith made to said disclosure. The disclosure in its entirety is subject matter of the present disclosure.

The cited document describes an injection-molded mat, for which it remained open, in what form the light was generated. In the meantime, it has become apparent that it is crucial to achieve a high light influx in an injection-molded mat with relatively low energy in order to achieve a light guide body that shines as brightly as possible with low electricity consumption and is embedded in a casting compound, e.g. in the form of a concrete body.

SUMMARY

The invention therefore addresses the problem of further developing a light guide mat for the production of a block- or cuboid-shaped light guide body, which mat is arranged in a casting mold and can be sealed in a pourable, curable casting compound, wherein the light guide mat consists at least to some extent of a light-conducting plastic, and light guide elements consisting of an at least partially light-conducting plastic are integrally formed on said light guide mat, one of the end faces of the light guide elements being formed as light-emitting surfaces on the upper face of the light guide body, and at least longitudinal struts of the light guide mat are formed as light channels for receiving point-like, light-generating elements, wherein the light channels are integrally formed on the face of the light guide element near to the bottom, and a cured light guide body with imbedded injection-molded mat consisting of a cured casting compound, in which a light guide mat is embedded such that at least the end faces of the light guide elements, which are arranged on the visible side of the light guide body, are light-emittingly visible, wherein the light is generated at the embedded light guide mat by LED elements, which are connected to one another in a chain-like manner, said LED elements being attachable at the bottom side of the light guide body on the light channels molded to the light guide mat such that a high lighting effect can be achieved with low electric energy.

In order to solve the problem addressed, a light guide mat, which preferably consists of a light-conducting plastic, wherein the light guide mat consists of longitudinal and transverse struts connected to one another in the form of a grid, and the profiled light guide elements are integrally formed at the point of intersection of the longitudinal and transverse struts, and that the light-generating elements are designed as LED elements, which are arranged on a mounting bar which is held in the light channel. A light guide body, in which a light guide mat is embedded, wherein the LED elements are fastened to a mounting bar which is held in the light channel.

The light guide mat embedded in the casting compound thus forms visible and luminous light elements on one or more visible surfaces of the light guide body. These light elements are part of the light guide mat and bring the light generated in or at the light guide mat to one or more visible sides of the light guide body by means of light conduction.

For both arrangements according to disclosed embodiments, it is paramount that it became apparent that a point-like light source, such as LED elements, are suitable for a favorable light influx in the light guide mat only if each point-like light source is arranged exactly at the bottom side of the profiled light guide elements, and so a concentrated light is generated on or onto the bottom side of the light guide element which thus radiates particularly brightly, and there are only small losses of scattered light.

In this context, the term "light guide element" refers to any structural element made of light-conducting plastic at the light guide mat, which is capable of transporting the light which is generated at the bottom side of such a light guide element by point-like light-generating elements by means of light conduction in the plastic material to the opposite visible side of the light guide body with the lowest possible losses of scattered light.

If a position of the individual elements of the injection-molded mat in the following description is assigned by using position-describing terms such as "horizontal" or "vertical," it shall refer to the alignment of the injection-molded mat and the cured light guide body thus formed in a lying (horizontal) plane. All terms are to be applied analogously if the position of the injection-molded mat and the cured light guide body is in a vertical plane.

Merely for simplification, a horizontally positioned injection-molded mat is assumed, even though the invention is not limited to such a positional assignment.

In a first preferred embodiment, at least the (horizontal) longitudinal struts of the light guide mat are formed as light channels for receiving and holding these light generating elements, wherein said light channels are simultaneously formed at least as longitudinal struts of the light guide mat.

As a result, plastic material is saved during the manufacture of the light guide mat in the plastic injection-molding process because the light guide mat designed in the form of a grid, which is preferably formed as an injection-molded mat, uses longitudinal and transverse struts that intersect in a grid-like manner.

If the longitudinal struts, according to the invention, are designed as light guide channels, they assume a double function. They form the stiffening struts of the lattice because at the same time they still function as longitudinal struts, and they serve as (light-conducting) light channels because they are suitable to receive and hold the light-generating, point-like elements and to redirect the generated light to the surrounding elements.

Due to this assignment of a double function, i.e. the longitudinal struts are simultaneously also formed as light channels, the mechanical stability of the light guide mat is maintained, and an additional, light-receiving function is simultaneously assigned to the longitudinal struts.

This has previously not been known in the prior art.

Of course, the invention is not limited to form only the (horizontal) longitudinal struts of a (planar horizontal) lattice of an injection-molded mat as light channels. In another embodiment of the invention, it is possible that the perpendicularly running (horizontal) transverse struts of the light guide mat are also designed as light channels.

Purely for reason of simplification, the following description shall proceed from the initially described embodiment because only the longitudinal struts are designed as light channels, even though the invention also relates to the double function, namely that the longitudinal and transverse struts or only the transverse struts are designed as light channels.

In a preferred embodiment of the invention, the vertical light guide elements arranged at the point of intersection of the lattice are designed so as to be cuboid-shaped or rectangular. These are thus relatively thin plastic platelets that are designed such that the light channel is integrally formed on their bottom side, and the opposite end face of the corresponding light guide element forms the light-emitting visible surface of the light guide body. The light guide elements are thus used for the light conduction in vertical direction through the cured light guide block.

Instead of using point-like light sources, which are designed particularly as electrically connected, chain-shaped LED elements, other light-generating elements can also be used, e.g. light tubes, with which no point-like light is generated at each point of intersection of the longitudinal and transverse struts but instead light is generated and evenly distributed over the entire length of the light channel. Such elements are also called light bars and can, e.g. be light bulbs along the lines of festoon bulbs or also fluorescent lamps or plasma light fixtures or fluorescence or luminescence light elements which are illuminated as active light elements with a suitable current supply. Of course, passive fluorescence or luminescence light elements are included in the subject matter of the invention.

However, the design of the point-like light sources at the points of intersection of the longitudinal and transverse struts is paramount for the present invention. Each lower part of a light guide element is integrally formed on said points of intersection, said light guide element being visible with its upper visible side on the upper face of the light guide body and emitting light therefrom.

In a preferred embodiment of the invention, the light channel according to the invention consists of a longitudinal profile which is semi-open toward the bottom side of the light guide mat, said longitudinal profile thus forming the longitudinal struts of the light guide mat, and the light-generating, preferably point-like elements being attached in said longitudinal profile.

In a preferred embodiment of the invention, the point-like light elements, which are preferably designed as LED elements, are detachably positioned in the light channel. It is proposed that the LED elements are attached in the manner of a chain one behind the other on a mounting bar which is held replaceably in the light channel. The LED elements lying one behind the other at a mutual distance in a chain-like manner can be embedded in a ribbon-like, bendable plastic strip. Said plastic strip is preferably designed so as to be transparent.

The LED elements embedded in the ribbon-like plastic strip can, e.g. be adhered to the base leg of a mounting bar with a U-shaped profile, and this mounting bar is subsequently replaceably attached in the light channel.

The mounting bar carrying the LED elements can be attached in different ways:

In a first embodiment, the mounting bar is detachably and replaceably clipped into the light channel.

In another embodiment, the mounting bar can be pressed, glued into or in another manner be permanently, non-replaceably attached in the light channel.

In a third embodiment, the ribbon-like plastic strip, which is preferably designed so as to be light-conducting and transparent, can be clipped, clamped or in a different manner detachably arranged directly in the light channel without the use of a mounting bar.

In a development of the invention, the light guide mat, which is preferably designed as an injection-molded mat, carries holding bars which are elongated at the edges, wherein these holding bars are formed as an extension of the transverse struts.

The holding bars arranged on each side serve as hold-down surfaces for hold-down dies arranged in the casting mold, which rest on the holding bars, thus protecting the light guide mat in the casting mold against floating when the casting compound is poured.

A cuboid- or block-shaped light guide body produced in accordance with an embodiment, which consists of a cured casting compound, is characterized in that the light is generated by LED elements that are connected to one another in the form of a chain such that the LED elements are attached to the bottom side of the light guide body, namely in light channels which are integrally formed on the light guide mat and which are accessible from the bottom side of the light guide body.

According to an embodiment, these light channels form the longitudinal struts of the light guide mat embedded in the light guide body.

It is thus possible for the first time to replace the light-generating LED elements on the bottom side of a completed and cured light guide body because the bottom side is released after demolding in the casting mold. During the casting process, the light guide channels of the embedded light guide mat were filled with place-holding profiles which are removed after the light guide body is cured, and so the LED elements themselves, which are connected to one another in the form of a chain, or the mounting bars, which carry the LED elements, or the plastic strips, in which the LED elements are embedded, can now be introduced in the resulting free light channels.

The introduction takes place—as described above—either in the form of a mounting bar which can be detachably or non-detachably fastened to the open light guide channels, or in the form of a plastic strip carrying the LEDs.

In a different embodiment of the innovative subject matter, a recess which extends over a plurality of grid points is incorporated in the bottom side of the light guide body, several bottom grooves being incorporated in said recess, and so an extensive recess, which reduces the height of the light guide body, or individual grooves are incorporated in the bottom side of the light guide body, in which light-generating elements can subsequently be attached.

In a first embodiment of this design, a so-called light panel is used as light-generating element, which consists of a transparent, light-conducting plastic material, in which a multitude of grid-type LED elements is arranged. It is thus a light panel, in which the light elements are arranged with a matrix-like distribution.

This light guide panel is clipped in its entirety to the bottom side of the light guide body and, due to the LED elements arranged in the grid dimension of the light guide bodies, generates a point-like light precisely at the grid points of the light guide mat and the light guide elements arranged at these points, said point-like light being relayed from there to the visible side of the light guide body.

Accordingly, this second embodiment provides that, instead of the formation of individual groove-shaped, semi-open light channels, in which point-like LED elements are arranged in the form of a chain and precisely associated with the light guide elements arranged above, a larger surfaces is freed on the bottom side of the cured light guide body, and so all grid points of the light guide mat open into this bottom side, and a larger light-generating light panel, which preferably covers the entire bottom side, can now be clipped or clamped or detachably or non-detachably attached in a different manner to said bottom side.

In a development, it is of course possible that the surface of the light guide panel is comparatively larger than the surface of the bottom side of the light guide body, and so such as light panel can extend over the bottom sides of a plurality of light guide bodies which lie next to and/or behind one another.

The inventive subject matter of the present invention not only derives from the subject matter of the individual claims but also from the combination of the individual claims.

Any and all descriptions and features disclosed in the documents, including the abstract, particularly the spatial design shown in the drawings, are claimed as essential to the invention insofar as they are individually or in combination novel over the prior art.

In the following, the invention shall be explained in more detail using drawings that show only one embodiment. For that purpose, further features and advantages essential to the invention are derived from the drawings and their description.

BRIEF DESCRIPTION OF THE DRAWINGS

Insofar as individual subjects are denoted as "essential to the invention" or "important," it does not mean that these subjects must necessarily form the subject matter of an independent claim. This shall only be determined by the current version of the independent patent claim.

FIG. 3 shows a cross-section according to line B-B in FIG. 1;

FIG. 4 shows a cross-section according to line C-C in FIG. 1;

FIG. 5 shows a cross-section according to line D-D in FIG. 1;

FIG. 25 shows a cross-section of the design according to FIG. 24 with a depiction of the suspension of the ceiling panel from a raw ceiling.

DETAILED DESCRIPTION

Figure 1:
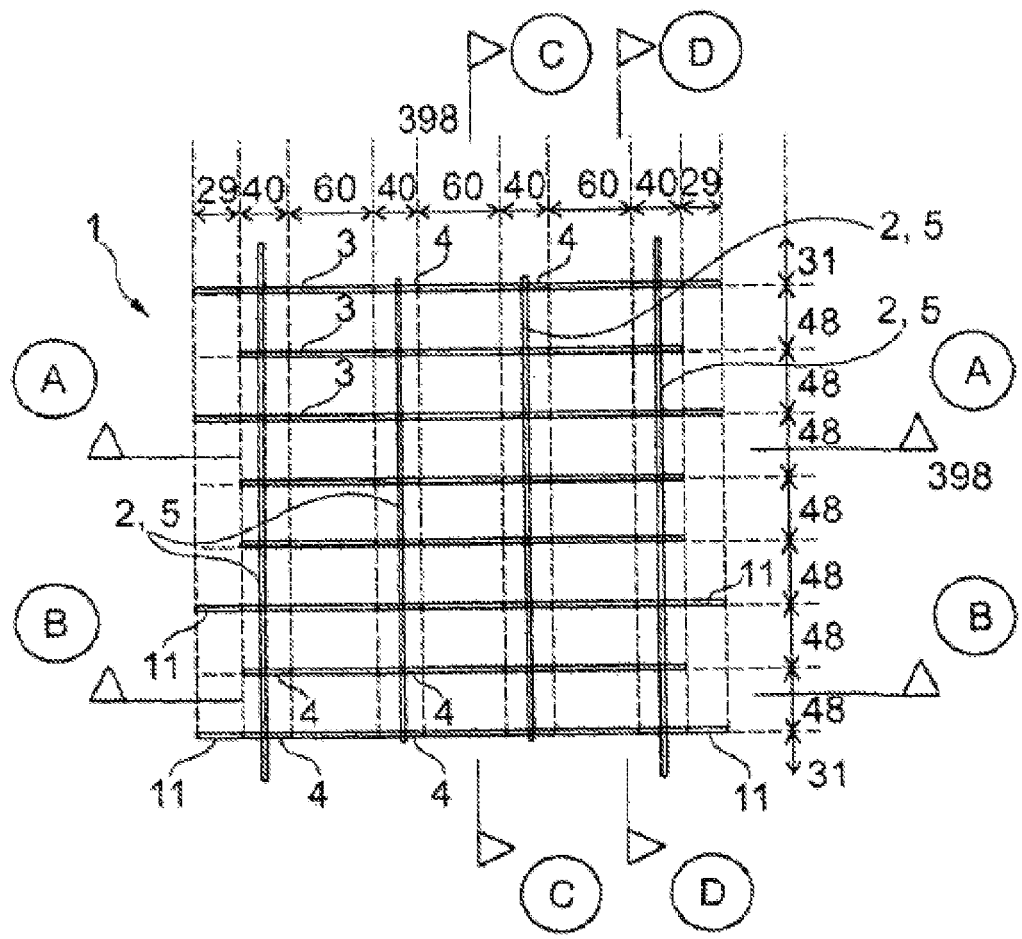
FIG. 1 shows a top view of a light guide mat according to the invention.

If numbers are shown in the drawings which are not associated to a reference line but are instead placed between 2 arrows, they are exemplary dimension specifications in millimeters. The specified dimensions are supposed to explain as an embodiment the preferred dimensions of the light guide body and its components without limiting the scope of protection of the invention.

The drawings show a light guide mat 1 which consists of a lattice of intersecting longitudinal and transverse struts 2, 3. The lattice preferably consists of a light-conducting plastic and is preferably produced with the plastic injection-molding method.

The longitudinal and transverse struts 2, 3 preferably intersect at an angle of 90°. However, any other crossing angle is also possible and is claimed as worthy of protection.

However, for reasons of simplification, only the drawing example according to FIG. 1, in which the longitudinal and transverse struts 2, 3 intersect at a right angle, shall be described in more detail.

The longitudinal and transverse struts 2, 3 preferably consist of a light-conducting plastic material, such as a PMMA, a polyacrylic, or any other light-conducting plastic material.

Figure 2:
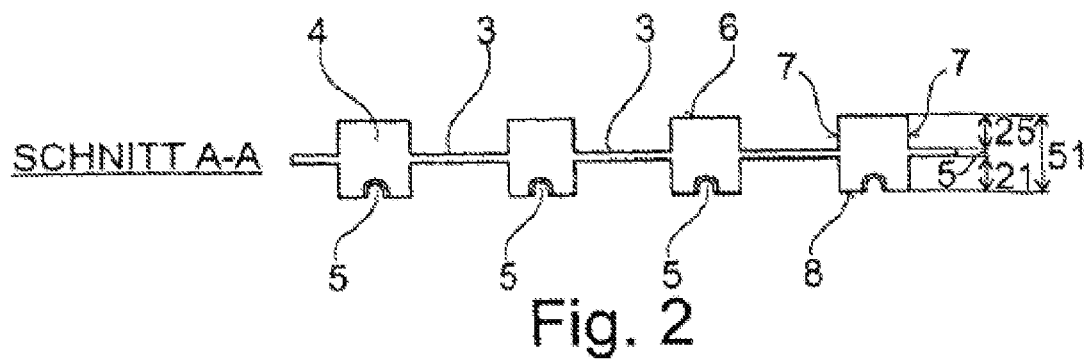
FIG. 2 shows a cross-section according to line A-A in FIG. 1.

According to FIGS. 2 and 3, the transverse struts 3 form approximately centered connections to light guide elements 4, which are also made from a light-conducting plastic. Preferably, all plastic elements of the light guide mat 1 are made of the same light-conducting plastic, even though the invention is not limited in that respect.

In the depicted embodiment, the light guide elements 4 are rectangular or square platelets with a thickness of, e.g. 4 mm and a height of 51 mm. The height corresponds approximately to the height of a subsequently produced light guide block, in which the light guide mat 1 is embedded.

Each of said transverse struts 32 adjoin the light guide elements 4, which continue in the same plane, approximately in the central area in an material-integral manner.

In a different design, it can be provided that the transverse struts 3 adjoin the bottom side of the corresponding light guide element 4 in a light-conducting and material-integral manner.

A preferred length of the transverse struts, which adjoin the light guide elements 4, is preferably 60 mm.

Such a light guide mat according to FIG. 1 can, e.g. have a width of 400 mm in transverse direction, and also a width of 400 mm in the direction of the longitudinal struts 2.

Holding bars 11 protrude at regular distances over the outer circumference of the light guide mat 1, said holding bars 11 jutting out over each of the edges of the grid-type profile channel 10 of the light guide mat 1 in order to create hold-down surfaces, when the light guide mat 1 is inserted in an upwardly open casting mold. For that purpose, dies (not depicted in detail) hold down the holding bars 11, which are designed so as to be outwardly elongated, and prevent a floating of the light guide mat 1, when the casting compound is poured into the casting mold.

It is important that the light guide elements 4 are directly light-conductingly connected to the light channels 5 which are intersecting the light guide elements 4. These light channels 5 are preferably injection-molded in a material-integral manner to the light guide elements 4 at the bottom side and thus form the longitudinal struts 2.

According to the invention, at least the longitudinal struts (2) of the light guide mat (1) are formed as light channels (5) for receiving point-like, light-generating elements, wherein the light channels (5) are integrally formed on the face of the light guide elements (4) near the bottom.

The term "light channels 5" indicates that these are semi-open profile channels 10 in the casting compound 24, into which a light-generating light bar is preferably detachably clipped. The term "light bar" refers to any light-generating strip-like or ribbon-like element which was described extensively in different designs in the section of the general description.

The light-receiving end faces of the light guide elements 4, which are made of a light-conducting plastic (preferably PMMA), protrude into the profile of the light channels 5, said end faces thus receiving the light from the light-generating light bars 12 and guiding it through the casting compound 24 to the upper and outer face of the (concrete) light guide body 21. Since the side walls of the light channels are arch-shaped (e.g. semicircular), the light-receiving end faces of the light guide elements are also designed so as to be arch-shaped and align approximately with the side walls of the light channels. Due to the arch-shaped design of the light-receiving end faces of the light guide elements 4, a particularly large light-receiving surface is created, and the effectiveness of the light influx onto this large surface of the light guide element is thus optimized.

However, the dotted lines in FIG. 3 also show that, parallel and at a vertical distance to the lower light channels 5, additional longitudinal struts 2 can be present which, approximately centered, adjoin the corresponding light guide element 4 in FIG. 3 and are connected to it in a material-integral manner.

However, this is only a modified embodiment, wherein in the preferred embodiment, the longitudinal struts 2 are formed by the light channels 5 themselves.

Figure 6:
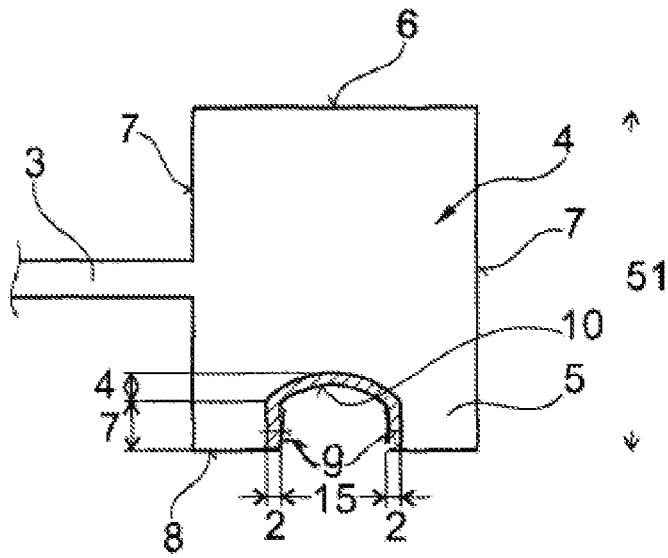
FIG. 6 shows enlarged detail 1 from FIG. 3.
Figure 7:
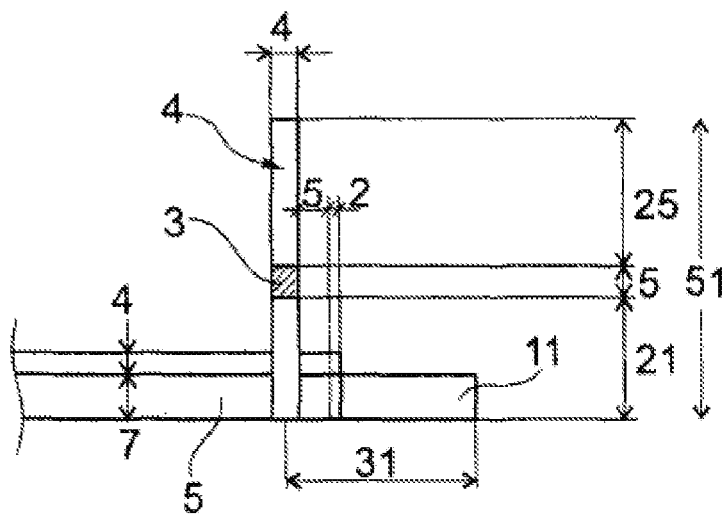
FIG. 7 shows enlarged detail 2 from FIG. 5.

In this case, the light channels according to FIGS. 2, 3, and 6 are designed as arch-shaped, approximately semicircular profile channels 10 which are open toward the bottom, and in which a suitable light-generating device is anchored.

Due to the light generation in the light channel 5, the light is diverted upward by the light element 4 and there leaves the light-emitting end face 6 of the light guide element 4, wherein the light-emitting end face 6 protrudes from the curing filling compound of a light guide body 21 or is aligned with such a light guide body 21, thus emitting the light visibly upward to the upper face of the light guide body 21.

The light guide elements 4 are designed so as to be approximately rectangular or square and their side surfaces 7 are aligned approximately perpendicularly to the light-emitting end face 6. The invention is not limited to this design. Any profile shape of the light guide element 4 can be used, wherein, e.g. the side surfaces 7 can also be designed so as to be raised, semicircular, polygonal, or the like.

In addition, the solution also does not require that the light guide elements 4 have a rectangular cross-section. They can also be designed so as to be semicircular, raised, or designed as circular or semicircular light bars or the like.

The bottom side 8 of the light guide elements 4 is preferably designed so as to be straight and is positioned perpendicularly to the side surface 7 of the corresponding light guide element 4.

It shall be described below that the bottom side 8 can be visible together with the light channel 5, which is integrally formed in this area, either on the rear side of the light guide body 21, or it can be completely embedded in the bottom side of the light guide body 21.

In a preferred embodiment of the invention according to FIG. 6, the profile channel 10 at the bottom side 8 of the light guide element 4 is designed to have an approximately semicircular shape and is designed, e.g. as a roof-edge profile. The light channel 5 designed as longitudinal strut 2 preferably has a thickness of 2 mm, and the clear width of the light channel can be approximately 15 mm.

The height of the straight wall of the profile 10 is approximately 7 mm, and the height of the rounded profile is approximately 4 mm. Overall, the total height of the light channel 5 is thus preferably 12 mm.

On the inner side of the profile 10, detent cams are arranged opposite and aligned to one another.

Figure 9:
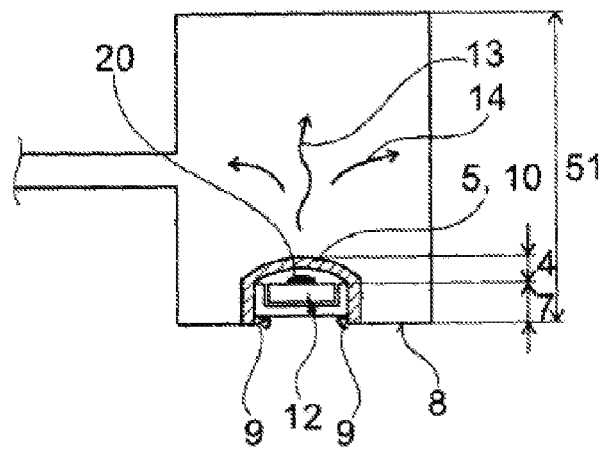
FIG. 9 shows the detail according to FIG. 6 with installed light-generating element in the form of a light bar.
Figure 10:
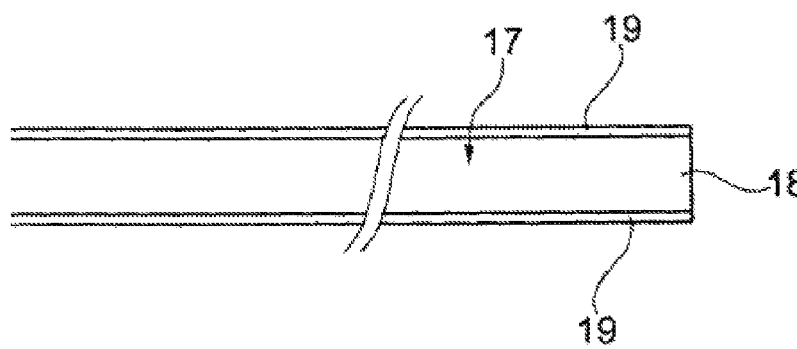
FIG. 10 shows the top view of the mounting bar according to FIG. 9.
Figure 11:
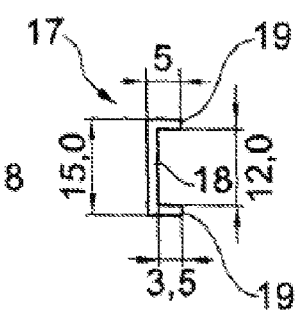
FIG. 11 shows the front view of the mounting bar according to FIG. 10.

According to FIG. 9, a mounting bar 17, which has an approximately U-shaped profile, is clipped into the interior of the profile 10 of the light channel 5. Said mounting bar 17 comprises a base leg 18, and the side legs 19 are integrally formed on said base leg 18. A preferred size of the inner side of the base leg 18 is approximately 12 mm, and the height of the side legs 19 is approximately 3.5 mm, thus resulting in an overall height of the mounting bar 17 of 5 mm.

According to FIG. 9, the light-emitting elements in the form of an LED chain are introduced in the interior of the mounting bar 17. The LEDs are thus series-connected and connected to a common power source. For example, a number of 8 LEDS can be distributed over a length of 400 mm, and the LED chain is placed into and adhered or clamped in the U-profile of the mounting bar 17.

Once the LED elements 20 have been assigned to the mounting bar 17, the thus completed mounting bar 17 is clipped or clamped into the profile channel 10 of the light guide channel 5 in accordance with FIG. 9.

The detent cams 9 support the mounting bar 17 to keep it from falling out.

This way, the mounting bar 17 is held in an easily replaceable manner in the light channel 5.

Figure 8:
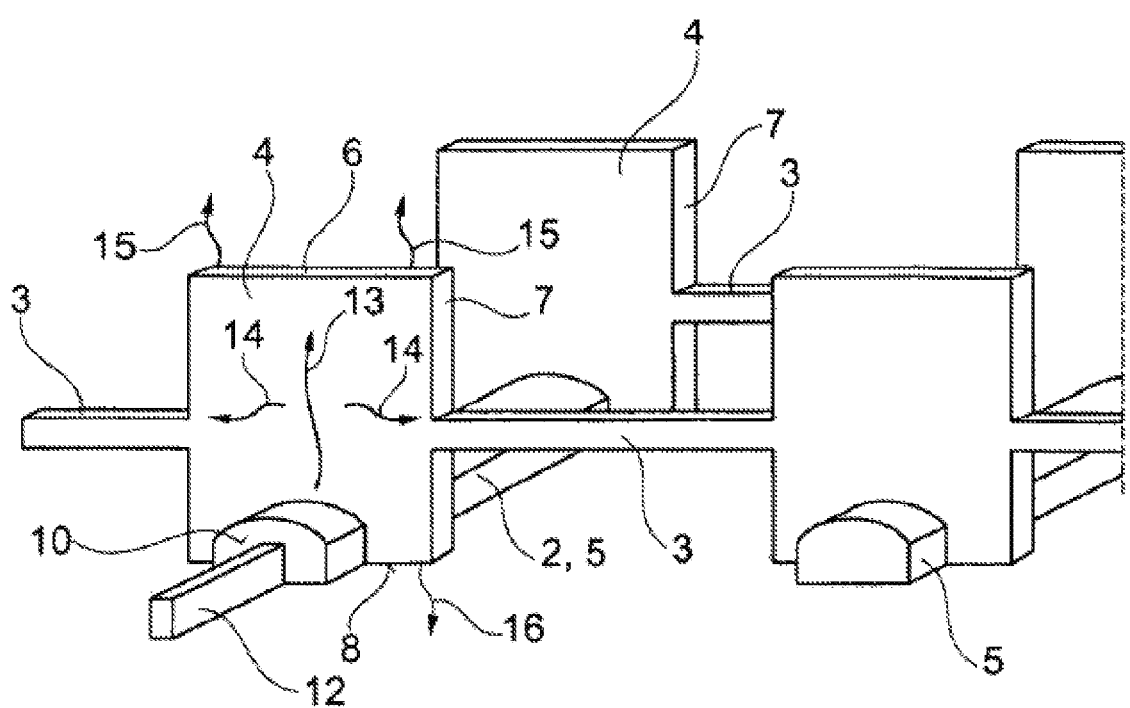
FIG. 8 shows perspectively a first embodiment of a light guide mat with attached light-emitting elements.

FIG. 8 shows a completely installed light guide mat, illustrating that a light bar 12 is created by the mounting bar 17 with LED elements 20 installed on said mounting bar 17, said light bar 12 being clipped into and detachably held in the profile channel 10 of the light channel 5.

Correspondingly, the light bar 12 sends the light in the direction of the arrow 13 upward to the light guide element 4, and within the light guide element 4, the light is also distributed laterally in the directions of the arrows 14 to the adjoining light-conducting transverse struts 3.

The lower end face 8 of the light guide element 4 also illuminates downward with a light emission in the direction of the arrow 16.

According to the invention, each LED element is arranged one behind the other in the light channel 5 precisely in the grid scale of the distance of the light guide elements. This means that, concentrated and aligned below each light guide element, one LED element is precisely arranged in the light channel, said LED element thus radiating a concentrated light beam onto and concentrically illuminating the light guide element 4. Scattered light losses toward the side are thus minimized.

This results in a very intensive light effect which is not reduced by scattered light losses.

Figure 12:
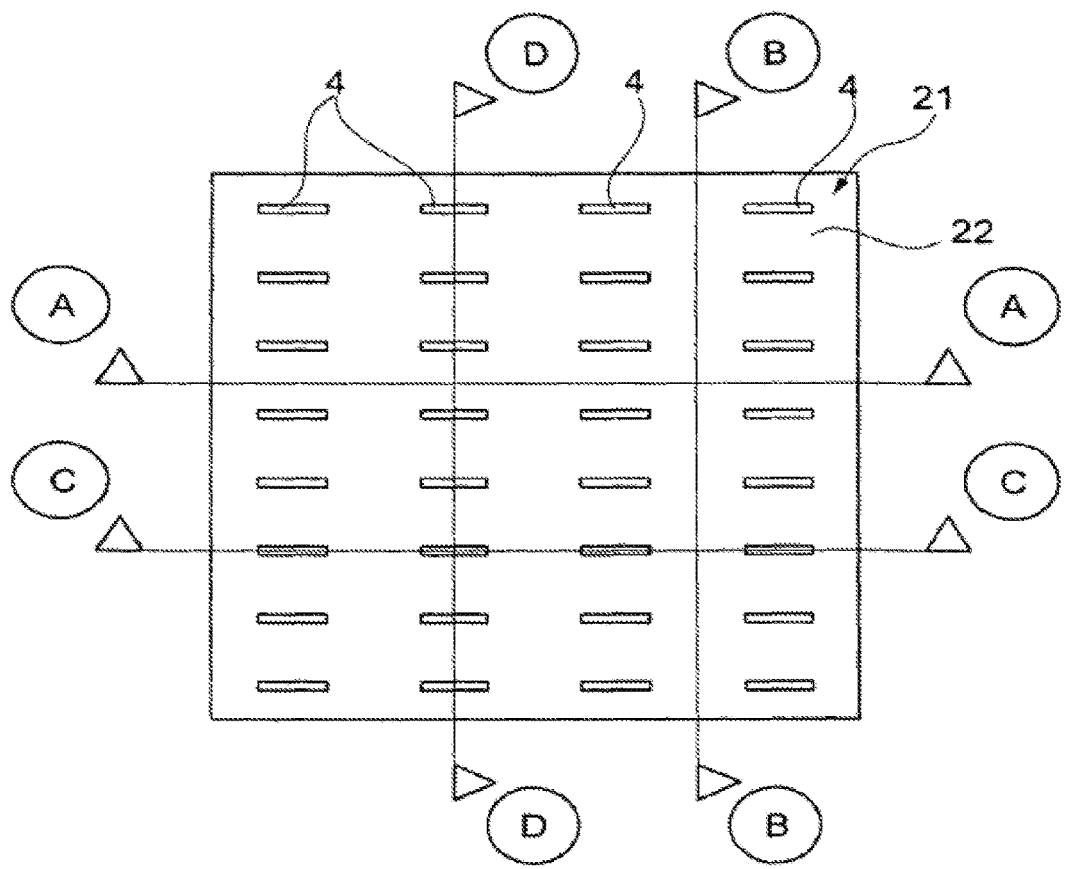
FIG. 12 shows the top view of a light guide body, which, e.g. is designed as a concrete body.
Figure 13:
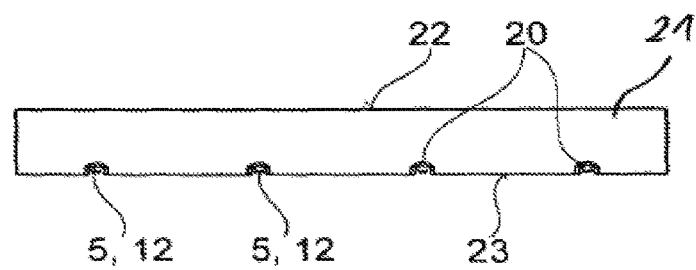
FIG. 13 shows a cross-section according to line A-A in FIG. 12.

FIG. 12 shows a preferred design of a light guide body 21 that consists of a pourable material which is cured and in which the light guide mat 1 is embedded.

On the upper face 22 of the light guide body 21, which, e.g. consists of concrete, a pourable plastic, a plastic composite body, or the like, only the light-emitting end faces 6 of the light guide elements 4 are visible and in a concentrated manner emit the light upwardly in the grid scale of the installed light guide elements 4.

Of course, it is not required that the light guide elements 4 are installed in the grid scale. Any design for generating light at the upper face 22 of the light guide body 21 can be used. Therefore, they can also form graphic or numerical or alphanumerical symbols and characters.

The bottom side 23 of the cured light guide body 21 is preferably open toward the bottom, and so the downwardly directed open light channels 5 are accessible even after completion of the light guide body 21. It is thus possible to replace the mounting bar 17, which consists of the light bar 12, with the LED elements 20 arranged on said mounting bar 17, at any time even after completion of the light guide body 21.

A preferred height of such a light guide body 21 is preferably 51 mm, and a grid dimension of 400×400 mm is preferred.

Figure 14:
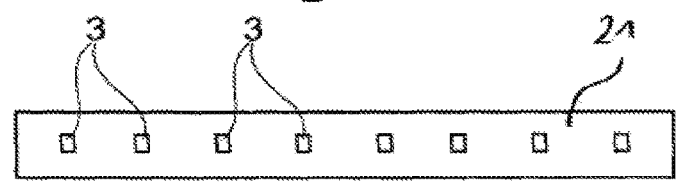
FIG. 14 shows a cross-section according to line B-B in FIG. 12.

FIG. 14 shows that the transverse struts 3 are molded into the material of the light guide body 21.

As mentioned above, the casting compound 24 can consist of any pourable and curable material.

Figure 15:
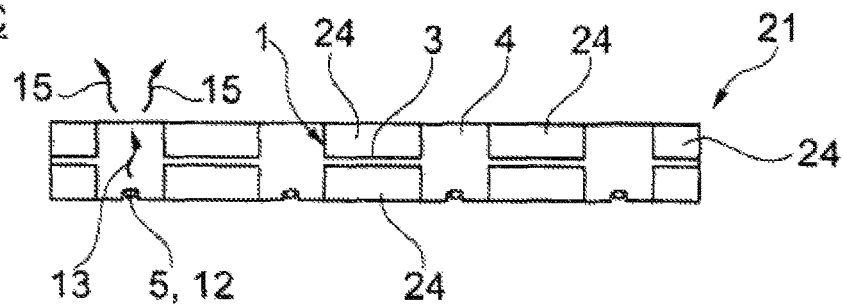
FIG. 15 shows a cross-section according to line C-C in FIG. 12.

FIG. 15 shows a cross-section according to line C-C in FIG. 12 which illustrates that the cured casting compound 24 encloses the transverse struts 2 from above and from below, and that the casting compound 24 is permeated by the light guide elements 4.

As a result, the light is emitted upwardly in a concentrated manner through the corresponding light guide element 4 in the direction of the arrow 15.

FIG. 15 further shows that the bottom side of the light guide body 21 is open toward the bottom in the area of the light channels 5.

However, the invention is not limited to this design. It can also be provided that the light channels 5 are enclosed in the material of the light guide body 21, and the bottom side is thus closed.

Figure 16:
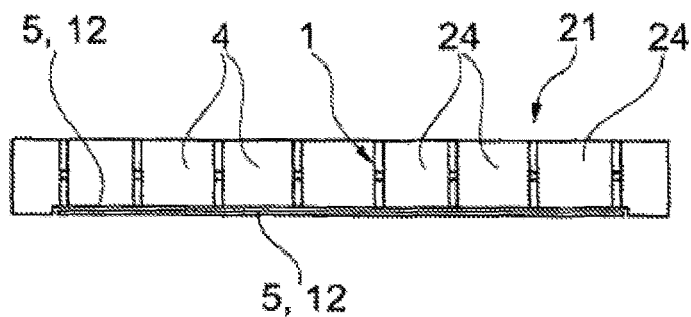
FIG. 16 shows a cross-section according to line D-D in FIG. 12.
Figure 17:
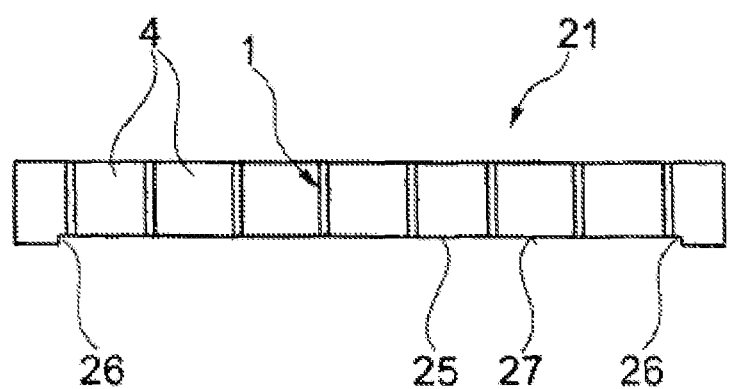
FIG. 17 shows a design modified when compared to FIG. 16.

The cross-section according to line D-D in FIG. 16 shows the embedding of the light guide elements 4 in the grid scale in the casting compound 24, and FIG. 17 shows, as modified embodiment, that a continuous bottom groove 25 can be present in the bottom side 23 of the light guide body 21, said bottom groove 25 comprising opposite undercuts 26.

In this manner, the bottom surface 27 of the light guide mat 1 embedded in it is exposed, and the light-receiving bottom sides 8 of the light guide elements 4 embedded in the grid scale become free. As a result, a light guide board, consisting of chain-like LED-elements can be clipped into the thus exposed bottom groove 25.

The light guide board (not depicted) is thus an extensive, light-emitting plate-shaped element which is clipped (engaged) or clamped as board behind the undercuts 26, thus illuminating the entire bottom surface 27 with the light-receiving bottom sides 8 of the light guide elements 4.

Due to the engagement in undercuts 26, the light guide board can thus be replaced at any time.

It can also be provided that the dimensions of the light guide board are greater than the dimensions of the light guide body 21 according to FIG. 17, and so the light guide board can also cover a plurality of adjacent light guide bodies 21 on the side of the bottom, and so one single light guide board can also provide a plurality of light guide bodies 21, which lie adjacent to one another, with light.

Figure 18:
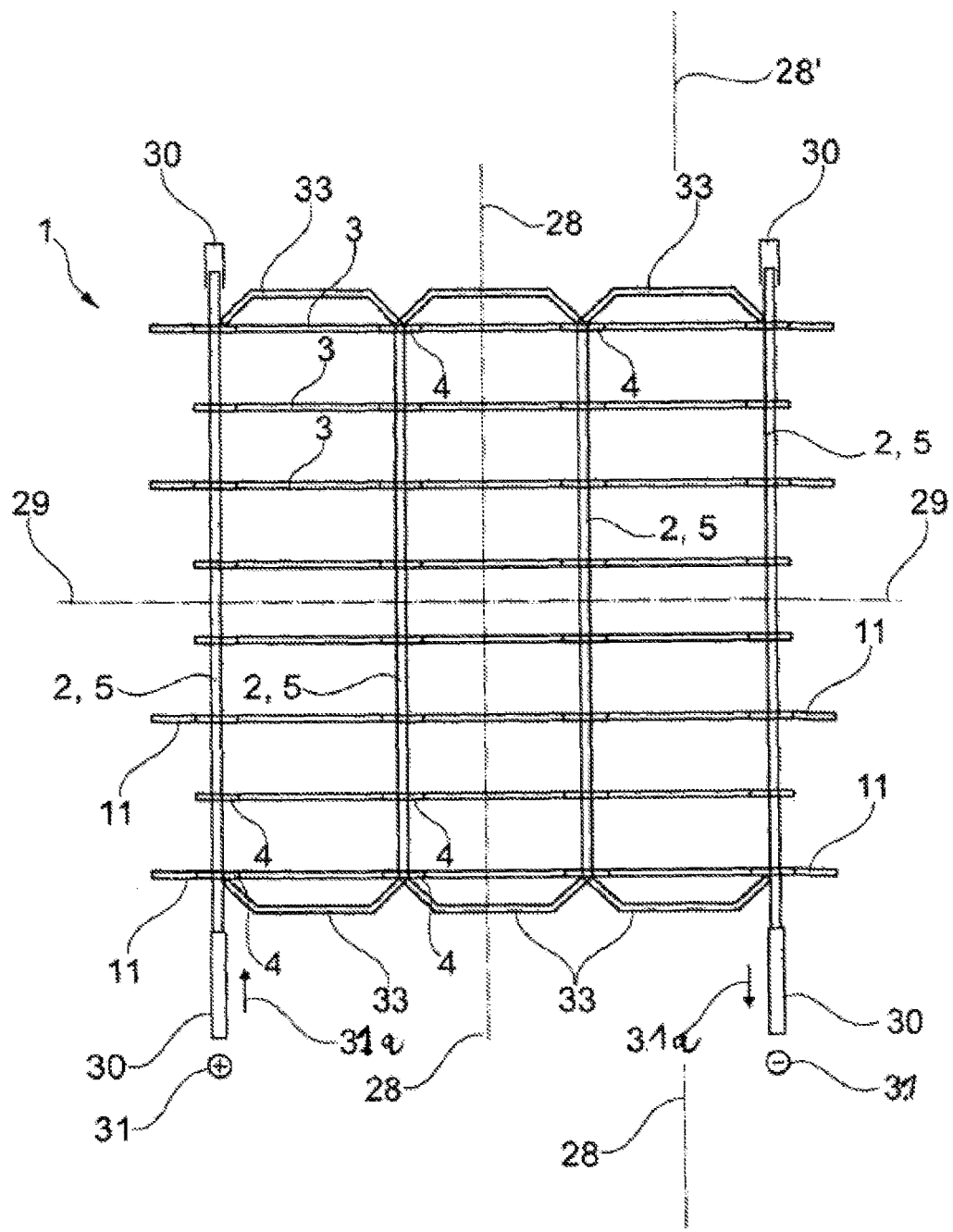
FIG. 18 shows a modification of FIG. 1 with further details.

FIG. 18 shows further details of a light guide mat 1 in accordance with all previously described embodiments.

It is shown that the light guide mat 1 can be divided either into symmetrical segments or asymmetrical segments. The light guide mat 1 shown in FIG. 18 can thus be separated along the vertical separation line 28 into segments, which are symmetrical to one another, and also along the horizontal separation line 29.

If an asymmetrical separation line 28' is selected instead of the symmetrical vertical separation line 28, the board can also be cut on a scale of 30/40. Each section has thus the dimension of 10/40 (cm). This is followed by 2 further boards with 30/20, and from that section follow 2×10/20 modular sections. Therefore, the light guide mat 1 according to the invention can be separated modularly by the specification of the aforementioned separation line 28, 28', 29.

FIG. 18 also shows additional cable channels 32 which each emerge at the end face between the point of intersection of the vertical and horizontal longitudinal and transverse struts 2, 3.

Proceeding from an electrical connection 31, power is fed in by means of the indicated current supplies 30 using the power cords 37 (see FIG. 21) installed in the cable channels 32 in order to supply the LED elements arranged at the points of intersection with power. The current direction 31a is entered merely as an example.

Figure 19:
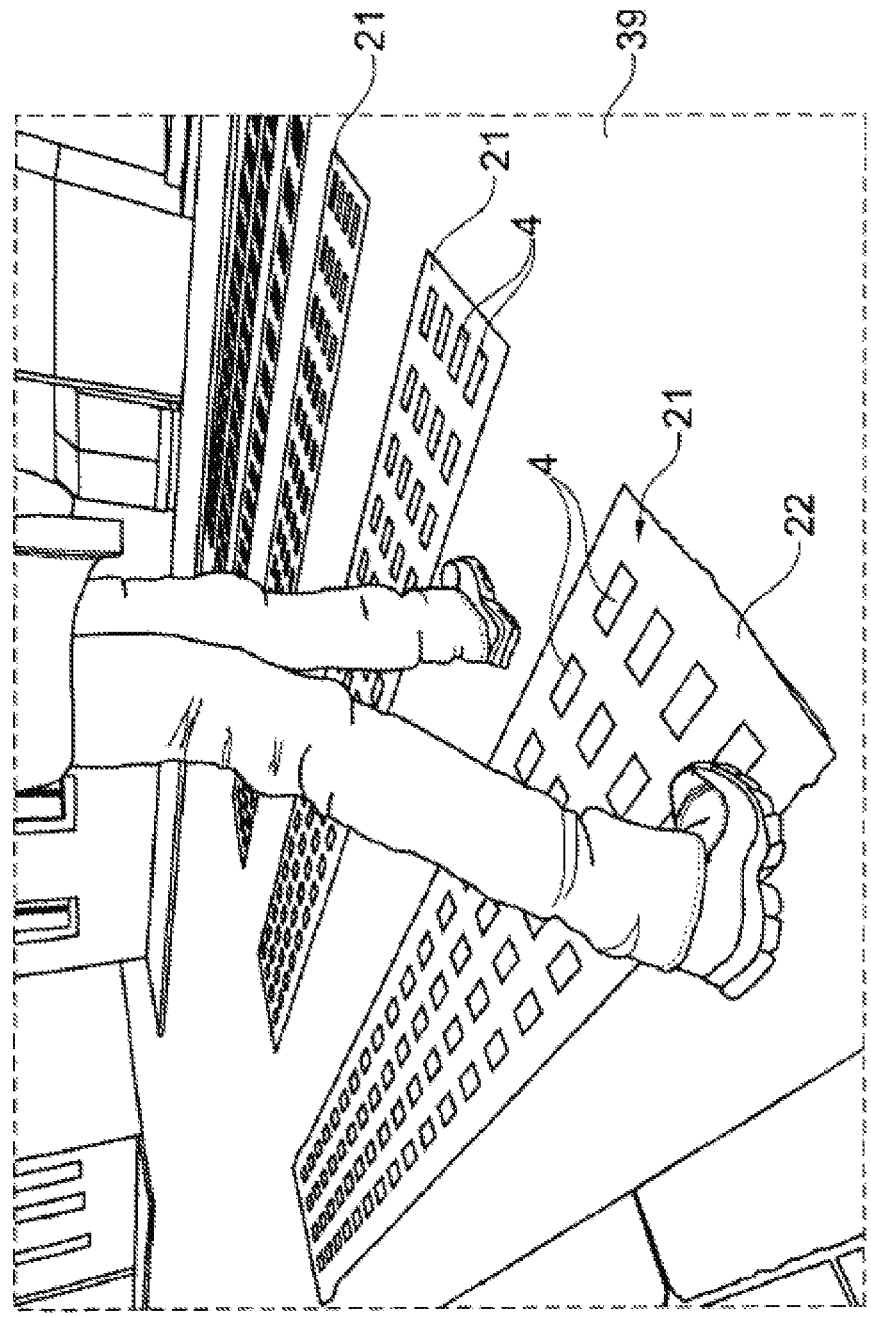
FIG. 19 shows an installation example for a light guide body in the surface of a street.

FIG. 19 shows a concrete light guide body 21, produced in accordance with the previous embodiments, which is installed preferably in a flush-mounted manner in the surface 33, e.g. of a street.

In the depicted embodiment, the concrete light guide bodies 21 with upward directed light-emitting light guide elements 4 serve as an illuminated crosswalk.

Figure 20:
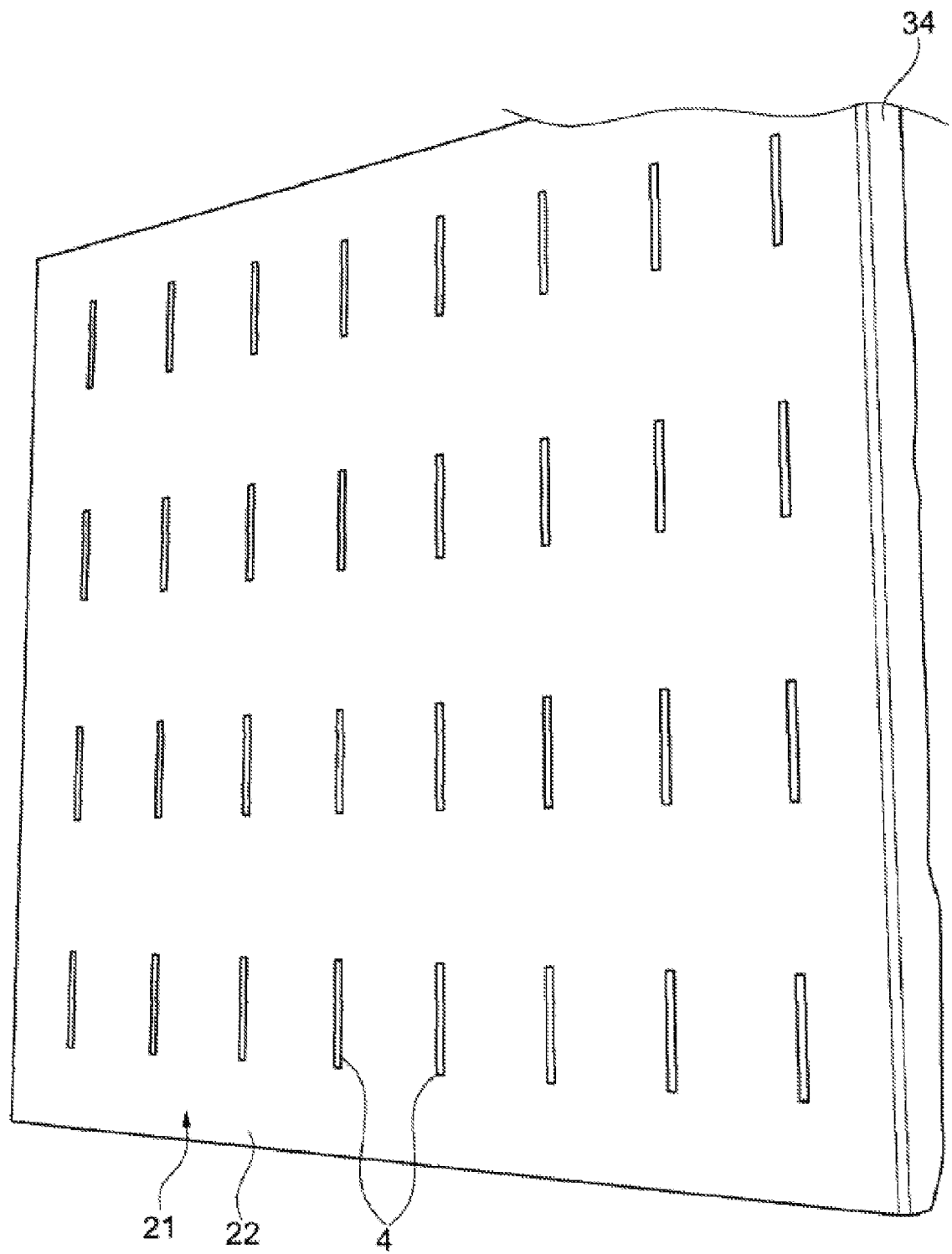
FIG. 20 shows a front view of a light guide body with a casting compound made of concrete according to FIG. 19.

FIG. 20 shows a view of the upper face 22 of a concrete light guide body 21 depicted in FIG. 19.

It can be seen that the light-emitting end faces of the light guide elements 4 are visible from the upper face 22 of the light guide body 21, and in their illuminated state—see FIG. 19—form optically impressive light graphics.

FIG. 20 shows, only as an example, the rectangular concrete body of the light guide body with an end face 34 also being visible.

Figure 21:
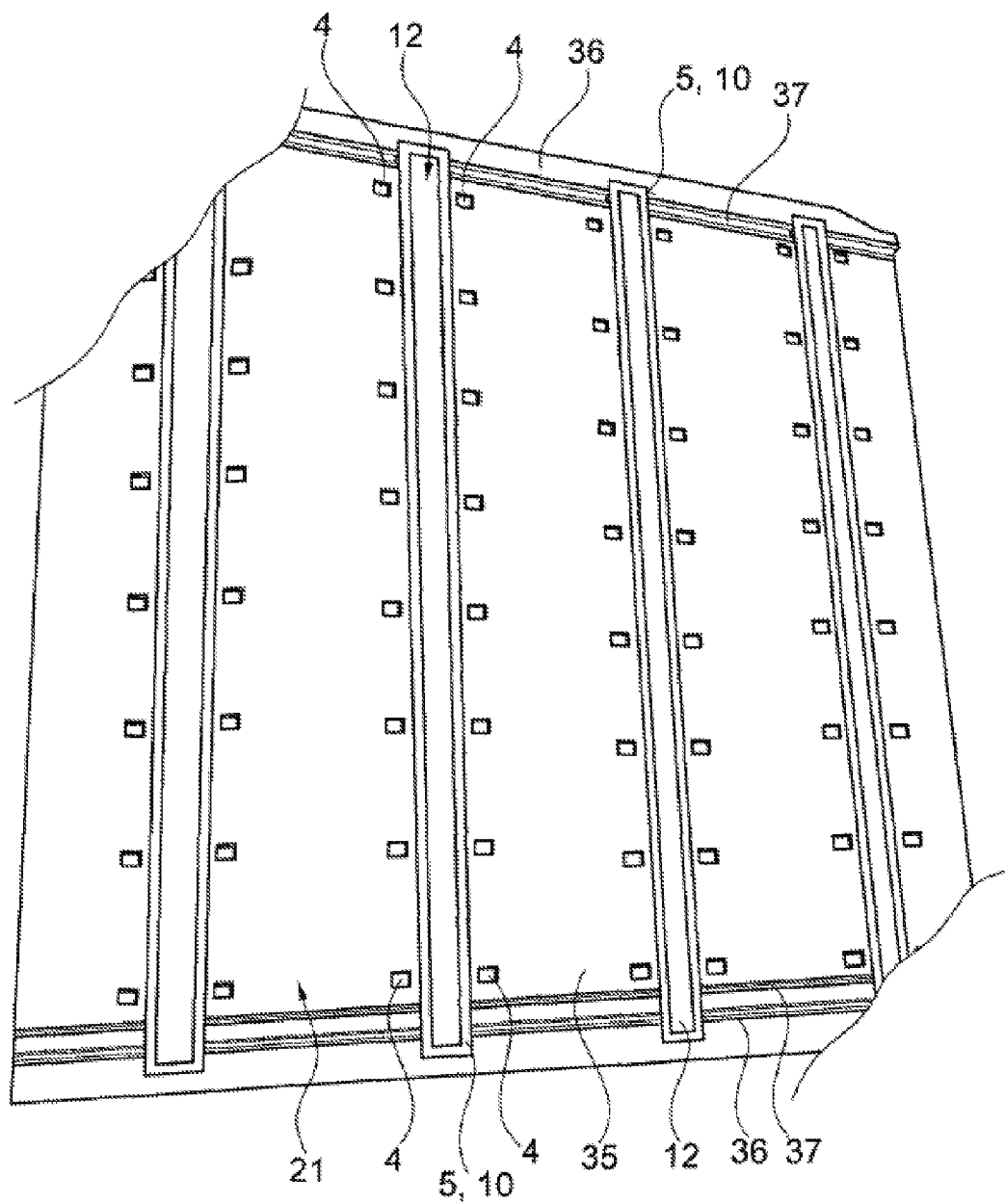
FIG. 21 shows a rear view of the light guide body according to FIGS. 19 and 20.

FIG. 21 shows the top view of the rear side of the concrete light guide body 21 according to FIG. 20, and the light channels 5 are formed parallel and at a mutual distance to one another in the area of the rear side 35, said light channels 5 being essentially made of semi-open profile channels 10 which are open toward the rear side 35.

The arch-shaped light-receiving sides of the plastic light guide elements 4, which are adjusted to the profile of the groove and align with said groove, protrude into the profile of the profile channels 10, and in the depicted embodiment, the profile channel 10 is covered by light bars 12.

The function and design of the light bars 12 has been described using FIGS. 6 and 9.

The light bar 12 preferably consists of a chain of electrically connected LED elements 20 which occupy a mutual distance to one another, but the invention is not limited to this design.

Any known light-emitting elements can be used as light bars 12.

In the top view of the rear side 35 of the light guide body 21, it can also be seen that a cable channel 36, which intersects with the profile channels 10, is arranged on one side of the light guide body 21, one or more power cables 37 for the power supply of the light bars 12 engaged in the profile channels 10 being arranged in said cable channel 36.

The invention is not limited to the arrangement of a single cable channel 36 which intersects with the profile channels 10. FIG. 21 shows that a further cable channel 36 is also arranged at the opposite side parallel to the lower cable channel 36.

The light bar 12 can thus be supplied with power from the side of the upper or from the side of the lower cable channel 36 or from both sides.

The cable channels 36 are preferably also open toward the rear side 35 of the light guide body 21, and the power cables 37 fastened in that location can be arranged easily detachably in the cable channel 36. This can be achieved with cable clamps or clips.

Figure 22:
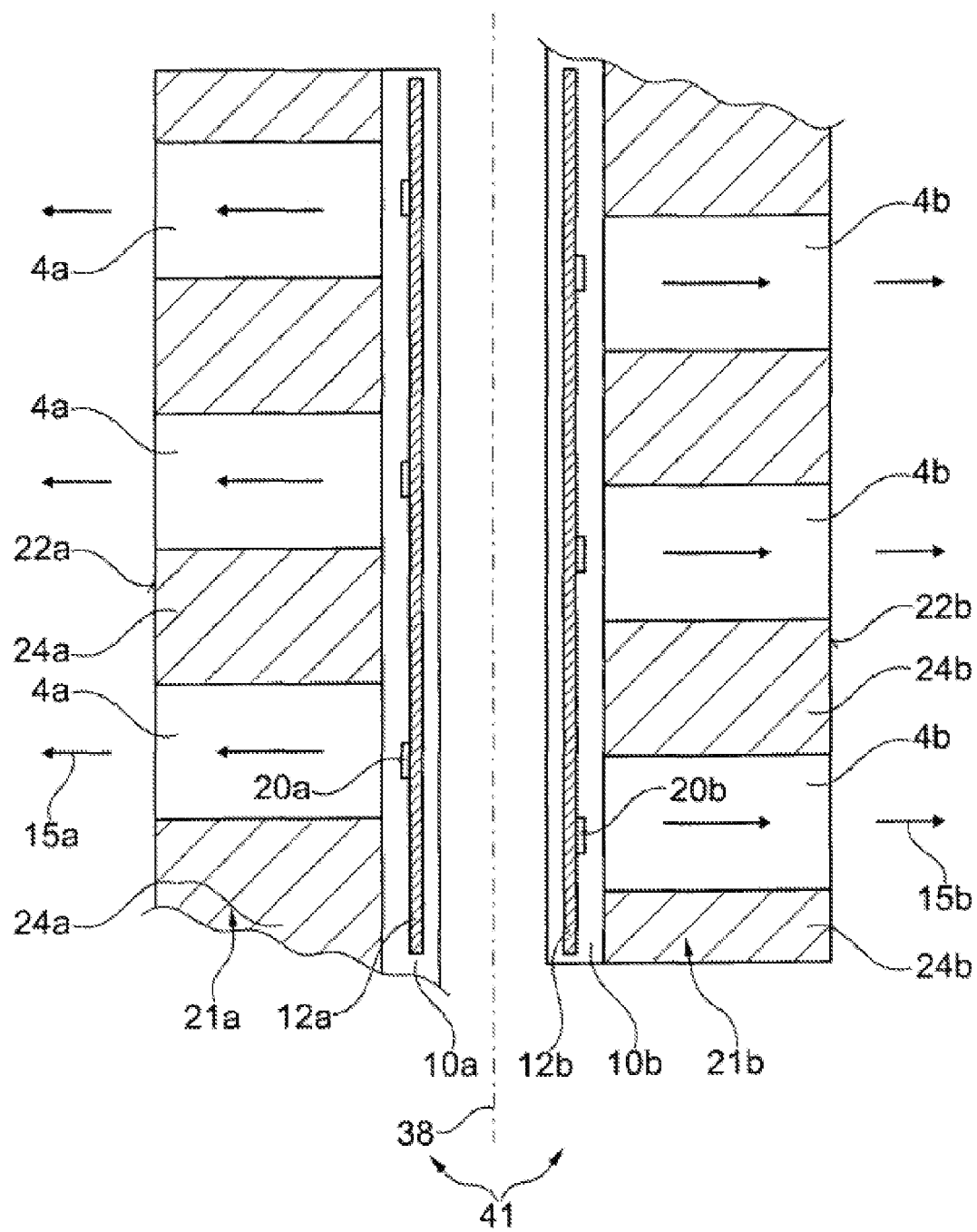
FIG. 22 shows a further embodiment with two opposite light guide bodies according to FIG. 19-21 in a separated state.

FIG. 22 shows a double element 41, which is comprised of two light guide bodies 21 according to FIGS. 20 and 21, wherein the two light guide bodies are denoted with reference signs 21a and 21b because their design is exactly identical. Therefore, the previous description for the light guide body 21 applies to each light guide body 21a, 21b.

The embodiment schematically also shows that the light bar 12 consists of a number of LED elements 20a, 20b which are arranged parallel and at an equal mutual distance to one another.

The two light guide bodies 21a, 21b are arranged along a mirror-symmetric separation plane 38 with their bottom sides opposite to one another. For clarification purposes, a depiction of a separated state of the double element 41 was selected for FIG. 22. The same proportions apply to FIG. 23, but in this drawing, the two light guide bodies 21a, 21b, with their bottom sides contacting one another, form the double element 41 which is functionally operational and ready to be installed.

Figure 23:
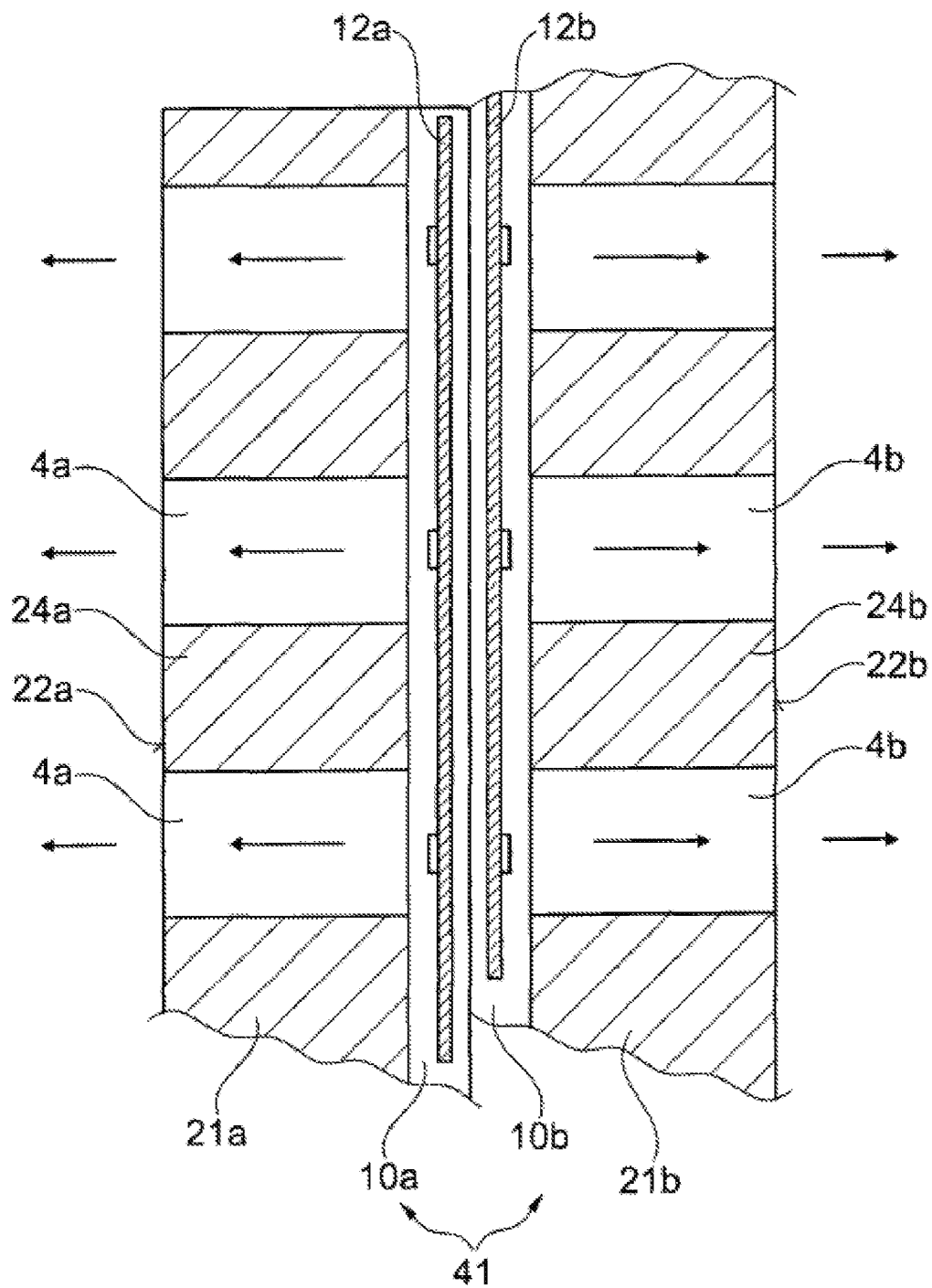
FIG. 23 shows the embodiment according to FIG. 22 in an assembled state.

In a different, not depicted embodiment, it is possible that only one single light bar 12 is present which, according to FIG. 23, means that the light bar 12a, 12b is combined to a single light bar, and the LEDs of the one side radiate to the left and the LEDs of the other side radiate to the right into the corresponding light-receiving light guide element 4.

This thus results in a light-emitting upper face 22a on the left side of the double element 41 and a light-emitting rear side of the double element 41 on the upper face 22b.

Such a double element 41 can, e.g. be designed as a separating wall in a building which emits light on both sides.

Figure 24:
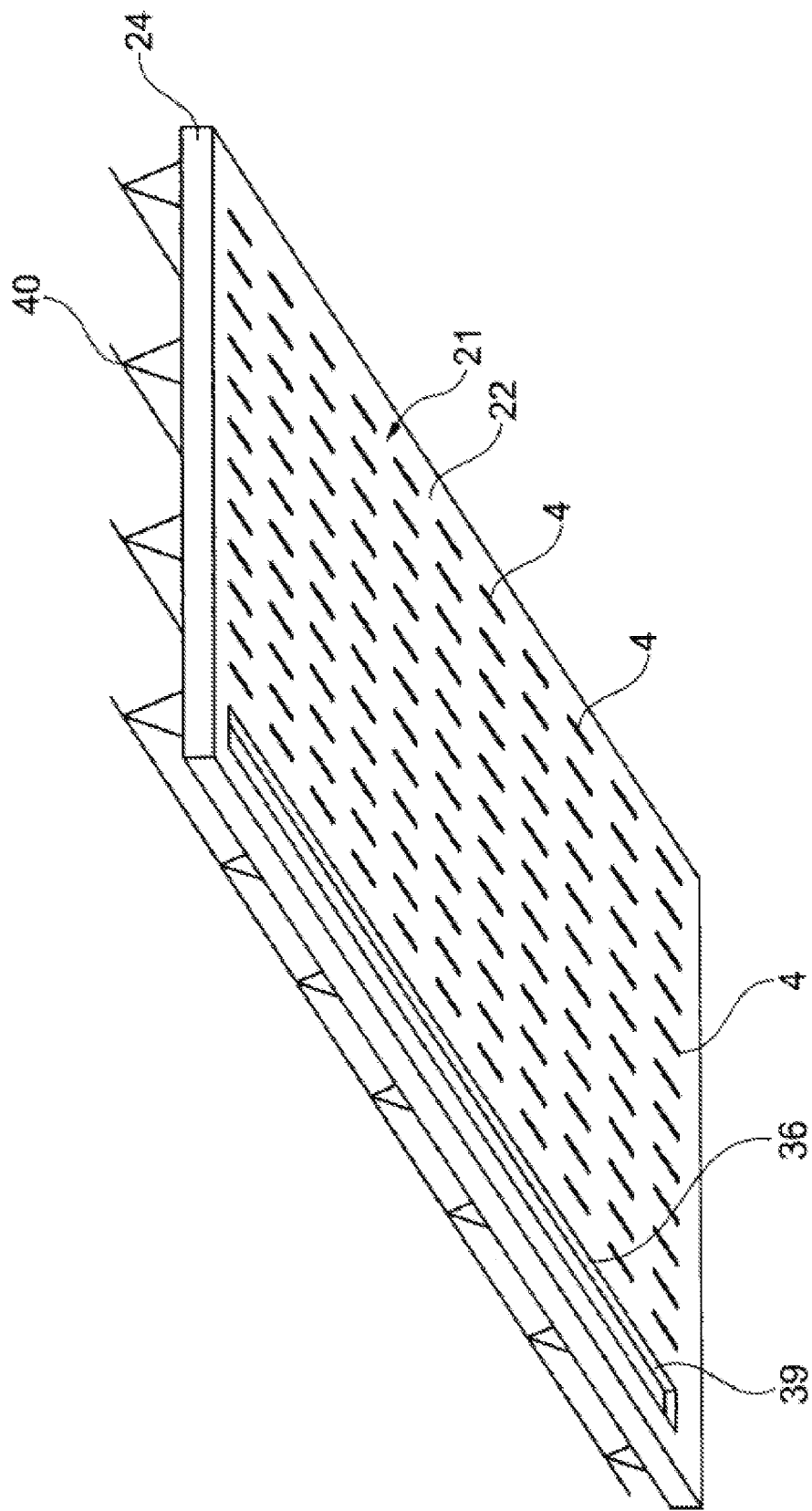
FIG. 24 shows a light guide body according to the embodiment similar to FIGS. 19-21 designed as a reinforced ceiling panel.

FIG. 24 shows as a further embodiment that the light guide body according to the invention, which is preferably designed as a concrete light guide body 21, is designed as a self-supporting ceiling element.

For that purpose, on its rear side, it is connected to a reinforcement 40 which in a generally known manner consists of reinforcing steel.

In the depicted embodiment, the reinforcement consists of triangular metallic round-profile wire supports which are embedded in the casting compound 24 of the light guide body and which are each connected to one another at their triangular tips by means of supporting members.

In such a ceiling panel, additional cooling or heating channels can be molded into the casting compound 24, and such a ceiling element can be cast with in-situ concrete as self-supporting ceiling element at the construction site in order to obtain its final static properties after the casting with in-situ concrete.

However, in a different embodiment, it can also be provided that the ceiling element shown in FIG. 24 is already given its final static properties after production at the plant and can thus be installed immediately at the construction site as self-supporting ceiling element in a ceiling composite structure—without casting with in-situ concrete.

In order to make the power cords 37 accessible, an inspection shaft 39, which is open toward the visible side (upper face 22), can be formed in the concrete light guide body 21, said inspection shaft 39 also serving as cable channel 36 for the power supply of the light bars 12.

In addition to the arrangement of a single inspection shaft 39, such an inspection shaft 39, in which the power cords are installed, can naturally also be provided at each of the two longitudinal sides of such a ceiling panel. Suitable electricity-generating modules, such as direct-current-generating power modules, can also be arranged in the inspection shaft.

As a further embodiment, FIG. 25 shows the integration of a ceiling panel according to FIG. 24 in a raw ceiling 42.

The reinforcement of the raw ceiling consists of supporting members 43, and the reinforcement 40 of the suspended ceiling panel according to FIG. 25 is suspended from the supporting members 43 of the raw ceiling 42.

The supporting members 45 of the reinforcement 40 on the side of the ceiling panel are cast into the casting compound 24 of the concrete light guide body 21.

This design demonstrates that the light-emitting light bars 12 can be brought out via the inspection shafts 39 and reinserted in an adjacent further ceiling panel.

It is thus not necessary to use one single light band with one single light bar 12 per ceiling panel. The depicted embodiment shows that the light bar 12 can also extend over a plurality of ceiling panels. It is also apparent that the light bars 12 installed in the profile channel 10 consist of individual LED elements which, preferably aligned and centered, are opposite of the light-receiving end faces of the light guide elements 4 in the profile channel 10, said end faces being preferably arch-shaped and adjusted to the profile of the channel, thus generating an intensive light irradiation onto each of the light receiving end faces of the light elements 4.

The light bars 12 with the individual LED elements can also be arranged slidably in axial direction and securably in the profile channel 10 in order to ensure a precise centrical assignment of the individual LED elements 20 to the light-receiving end faces of the light guide elements 4.

FIG. 25 also shows that the triangular reinforcement 40 on the side of the ceiling panel is each connected to lower transverse bars 46 which are cast into the casting compound of the ceiling panel and run approximately parallel and at a distance to the profile channels 10 in the concrete body.

LIST OF REFERENCE SIGNS

1 Light guide mat
2 Longitudinal strut
3 Transverse strut
4 Light guide element
5 Light channel
6 End face (of 4)
7 Side surface
8 Bottom side
9 Detent cam
10 Profile channel
11 Holding bar
12 Light bar
13 Direction of arrow
14 Direction of arrow
15 Direction of arrow
16 Direction of arrow
17 Mounting bar
18 Base leg
19 Side leg
20 LED element
21 Light guide body (e.g. concrete)
22 Upper face
23 Bottom side
24 Casting compound
25 Bottom groove
26 Undercut
27 Bottom surface
28 Separation line vertical
29 Separation line horizontal
30 Current supply
31 Electrical connection
32 Cable channel
33 Surface (e.g. street)
34 End face (of 21)
35 Rear side (of 21)
36 Cable channel (in 35)
37 Power cord
38 Separation plane
39 Inspection shaft
40 Reinforcement (of 21)
41 Double element (of 21a and 21b)
42 Raw ceiling
43 Supporting member (of 42)
44 Reinforcement (of 42)
45 Supporting member (of 40)
46 Transverse bar (of 40)

The invention claimed is:

1. A light guide mat for the production of a block- or cuboid-shaped light guide body, which mat is arranged in a casting mold and can be sealed in a pourable, curable casting compound, wherein the light guide mat consists at least to some extent of a light-conducting plastic, and light guide elements consisting of an at least partially light-conducting plastic are integrally formed on said light guide mat, one of the end faces of the light guide elements being formed as light-emitting surfaces on the upper face of the light guide body, and at least longitudinal struts of the light guide mat are formed as light channels for receiving point-like, light-generating elements, wherein the light channels are integrally formed on the face of the light guide element near to the bottom, wherein the light guide mat consists of longitudinal and transverse struts connected to one another in the form of a grid, and the profiled light guide elements are integrally formed at the point of intersection of the longitudinal and transverse struts, and the light-generating elements are designed as LED elements, which are arranged on a mounting bar which is held in the light channel, the mounting bar and the light channel extending longitudinally in the same direction as the longitudinal struts.

2. The light guide mat according to claim 1, wherein the light guide mat consists of a injection- or die-casting-moldable plastic, and the longitudinal and transverse struts and the light guide elements form a material-integral light-conducting plastic part.

3. The light guide mat according to claim 1, characterized in that the LED elements are electrically conductingly connected to one another, and each element is positioned opposite at the bottom side of the light guide element.

4. The light guide mat according to claim 1, characterized in that the mounting bar has a U-shaped profile and can be clipped or clamped into the interior of the profile of the light channel.

5. The light guide mat according to claim 1, characterized in that the LED elements are designed as an LED chain, which is adhered or clamped to the mounting bar.

6. The light guide mat according to claim 1, characterized in that at least the transverse struts of the light guide mat are extended at the edge as holding bars in order to form hold-down surfaces for hold-down dies arranged in the casting mold.

7. The light guide mat according to claim 1, characterized in that detent cams hold the mounting bar in the light guide channel (5).

8. The light guide mat according to claim 1, characterized in that the light guide bodies produced with the curing casting compound are connected to one another mirror-invertedly along a separation plane on the side of the bottom and form a double element that emits light on both sides.

9. The light guide mat according to claim 1, characterized in that the plate-shaped light guide body is designed as a ceiling panel suspended from a raw ceiling.

10. A light guide mat for the production of a block- or cuboid-shaped light guide body, which mat is arranged in a casting mold and can be sealed in a pourable, curable casting compound, wherein the light guide mat consists at least to some extent of a light-conducting plastic, and light guide elements consisting of an at least partially light-conducting plastic are integrally formed on said light guide mat, one of the end faces of the light guide elements being formed as light-emitting surfaces on the upper face of the light guide body, and at least longitudinal struts of the light guide mat are formed as light channels for receiving point-like, light-generating elements, wherein the light channels are integrally formed on the face of the light guide element near to the bottom, wherein the light guide mat consists of longitudinal and transverse struts connected to one another in the form of a grid, the profiled light guide elements being integrally formed at the point of intersection of the longitudinal and transverse struts, the light-generating elements being designed as LED elements, which are arranged on a mounting bar which is held in the light channel, and a profile channel, which is open toward the bottom side of the light guide mat, and the light-receiving end faces of the light guide elements embedded in the casting compound protrude into said profile channel, and the light-generating light bars are arranged in said profile channel.

11. A cuboid or block-shaped light guide body consisting of a cured casting compound, in which a light guide mat is embedded such that at least the end faces of the light guide elements, which are arranged on the visible side of the light guide body, are light-emittingly visible, wherein the light is generated at the embedded light guide mat by LED elements, which are connected to one another in a chain-like manner, said LED elements being attachable at the bottom side of the light guide body on the light channels molded to the light guide mat, wherein the LED elements are fastened to a mounting bar which is held in the light channel.

12. The light guide body according to claim 11, characterized in that in the bottom side of the light guide body, recesses or one or more bottom grooves are incorporated, with the bottom sides of the light guide elements opening into the bottom surface of said bottom grooves on the side of the light guide body, and that the mounting bar is arranged in the area of the recesses or the one or more bottom grooves.

13. A light guide mat for the production of a block- or cuboid-shaped light guide body, which mat is arranged in a casting mold and can be sealed in a pourable, curable casting compound, wherein the light guide mat consists at least to some extent of a light-conducting plastic, and light guide elements consisting of an at least partially light-conducting plastic are integrally formed on said light guide mat, one of the end faces of the light guide elements being formed as light-emitting surfaces on the upper face of the light guide body, and at least longitudinal struts of the light guide mat are formed as light channels for receiving point-like, light-generating elements, wherein the light channels are integrally formed on the face of the light guide element near to the bottom, wherein the light guide mat consists of longitudinal and transverse struts connected to one another in the form of a grid, and the profiled light guide elements are integrally formed at the point of intersection of the longitudinal and transverse struts, and the light-generating elements are designed as LED elements, which are arranged on a mounting bar which is held in the light channel, wherein one or more semi-open cable channels at the bottom are molded into the casting compound of the light guide body approximately perpendicularly to the semi-open light channels at the bottom, and the power cords for the energy supply of the light bars are arranged in the cable channels.

14. A light guide mat for the production of a block- or cuboid-shaped light guide body, which mat is arranged in a casting mold and can be sealed in a pourable, curable casting compound, wherein the light guide mat consists at least to some extent of a light-conducting plastic, and light guide elements consisting of an at least partially light-conducting plastic are integrally formed on said light guide mat, one of the end faces of the light guide elements being formed as light-emitting surfaces on the upper face of the light guide body, and at least longitudinal struts of the light guide mat are formed as light channels for receiving point-like, light-generating elements, wherein the light channels are integrally formed on the face of the light guide element near to the bottom, wherein the light guide mat consists of longitudinal and transverse struts connected to one another in the form of a grid, and the profiled light guide elements are integrally formed at the point of intersection of the longitudinal and transverse struts, and the light-generating elements are designed as LED elements, which are arranged on a mounting bar which is held in the light channel wherein a ceiling reinforcement is integrally formed on the plate-shaped light guide body, and an inspection shaft, which is open toward the front side, is molded to the front side of the light guide body, such that at least the power cords inserted therein are accessible.

15. The light guide mat according claim 14, wherein the rear side reinforcement of the ceiling panel suspended from the raw ceiling is suspended from the reinforcement on the raw ceiling.

* * * * *